(12) United States Patent
Hillebrand

(10) Patent No.: US 8,099,404 B2
(45) Date of Patent: Jan. 17, 2012

(54) METHOD FOR TESTING BROWSER-ADAPTING SERVER APPLICATIONS

(75) Inventor: Rainer Hillebrand, Greven (DE)

(73) Assignee: T-Mobile Deutschland GmbH, Bonn (DE)

( * ) Notice: Subject to any disclaimer, the term of this patent is extended or adjusted under 35 U.S.C. 154(b) by 1267 days.

(21) Appl. No.: 10/524,655

(22) PCT Filed: Jul. 5, 2003

(86) PCT No.: PCT/DE03/02252
§ 371 (c)(1),
(2), (4) Date: Feb. 17, 2005

(87) PCT Pub. No.: WO2004/021188
PCT Pub. Date: Mar. 11, 2004

(65) Prior Publication Data
US 2006/0031512 A1 Feb. 9, 2006

(30) Foreign Application Priority Data

Aug. 26, 2002 (DE) .................................. 102 39 686

(51) Int. Cl.
*G06F 17/30* (2006.01)
(52) U.S. Cl. ........................................ 707/706; 707/770
(58) Field of Classification Search .................. 709/227; 707/706, 770
See application file for complete search history.

(56) References Cited

U.S. PATENT DOCUMENTS

| 6,073,241 | A  | * | 6/2000  | Rosenberg et al. | 726/3   |
| 6,167,441 | A  | * | 12/2000 | Himmel           | 709/217 |
| 2003/0088659 | A1 | * | 5/2003  | Susarla et al.   | 709/223 |
| 2004/0012627 | A1 | * | 1/2004  | Zakharia et al.  | 345/744 |

FOREIGN PATENT DOCUMENTS
CA 2 325 654 5/2002
* cited by examiner

*Primary Examiner* — Kim Nguyen
(74) *Attorney, Agent, or Firm* — Leydig, Voit & Mayer, Ltd.

(57) ABSTRACT

A method for testing a browser-adapting server application includes collecting and recording, using another server application, key information of a number of browser types and/or versions. The information adaptation method of the browser-adapting server application is tested using the key information.

20 Claims, 2 Drawing Sheets

METHOD FOR TESTING BROWSER-ADAPTING SERVER APPLICATIONS

CROSS-REFERENCE TO RELATED APPLICATIONS

This application is a U.S. National Stage Application under 35 U.S.C. §371 of PCT International Application No. PCT/DE2003/002252, filed Jul. 5, 2003, which claims priority to German Patent Application No. DE 102 39 686.8, filed Aug. 26, 2002. Each of these applications is incorporated herein by reference as if set forth in its entirety.

The present invention relates in general to a method for testing browser-adapting server applications, and specifically to a method for testing browser-adapting server applications, where key information directly or indirectly obtained about an information-requesting browser is evaluated in order to adapt the browser-adapting server applications.

BACKGROUND

One of the most important application areas of the Internet, or, generally, of networked environments, is the distribution of information. In this context, "information" is generally understood to be data which is made available to one or a plurality of users. This information is usually linked to a fixed environment, such as Email, Word Wide Web, FTP, or even independent programs, which can be used to retrieve this information. The linkage between the information and its environment very often determines the format of the information. For example, information in the World Wide Web is available as HTML, information that can be loaded using FTP (texts, programs, etc.) is in an arbitrary format, and information from information systems, such as are frequently found in Intranet applications, is in a format specifically defined for this environment only.

Therefore, the information provided, for example, on World Wide Web (WWW) and Wireless Application Protocol (WAP) servers, is often adapted to the capabilities of the requesting browser. To this end, these servers, or applications accessible via these servers, needs to maintain databases providing information about the capabilities of each individual browser. Due to the nearly unimaginable number of browsers in use throughout the world, the effort required for updating the databases is not to be underestimated. When requesting data from a server, every browser sends so-called "key information" to the server; the key information characterizing the browser. This key information includes, for example, information about the kind, type and current version of the browser, the natural languages supported by the browser, the supported file and graphics formats, etc.

When a new browser appears on the national or international market, it must be added to the database together with information about its capabilities, after which the browser-adapting server application must be tested for its adaptation method. If the adaptation method needs to be modified, a test must be performed for the browsers already previously supported by the browser-adapting server application in order to ensure that the modifications made to the adaptation method do not affect the previously supported browsers. Depending on, for example, the number of browsers already supported and the number of functions implemented in a server application, this can result in a considerable testing effort. This testing effort can cause considerable delays in supporting newly appeared browsers, depending on the availability of resources. Prompt updating of the server application is only possible with extensive use of resources. The procurement of the new browsers to be able to subsequently use them for local testing may result in further delay. A suitable test environment must be provided for each kind of browser.

SUMMARY OF THE INVENTION

It is an object of the present invention to provide a method by which adaptation methods for adapting information-providing server applications to the capabilities of information-requesting browsers can be tested with little effort so as to minimize the testing effort for browser-adapting server applications.

The present invention provides a method for testing a browser-adapting server application. The method includes:

collecting and recording, using another server application, respective key information of a plurality of browser types and/or versions; and testing an information adaptation method of the browser-adapting server application using the key information.

DETAILED DESCRIPTION

Figure 1:
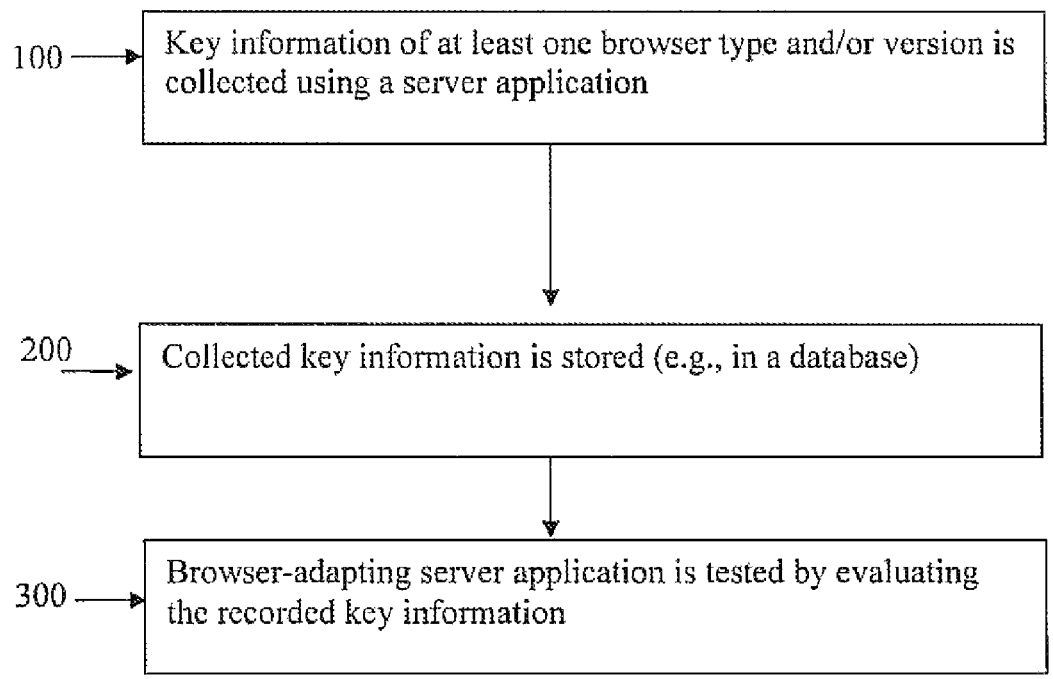
FIG. 1 illustrates a method for testing a browser-adapting server application according to the present invention.
Figure 2:
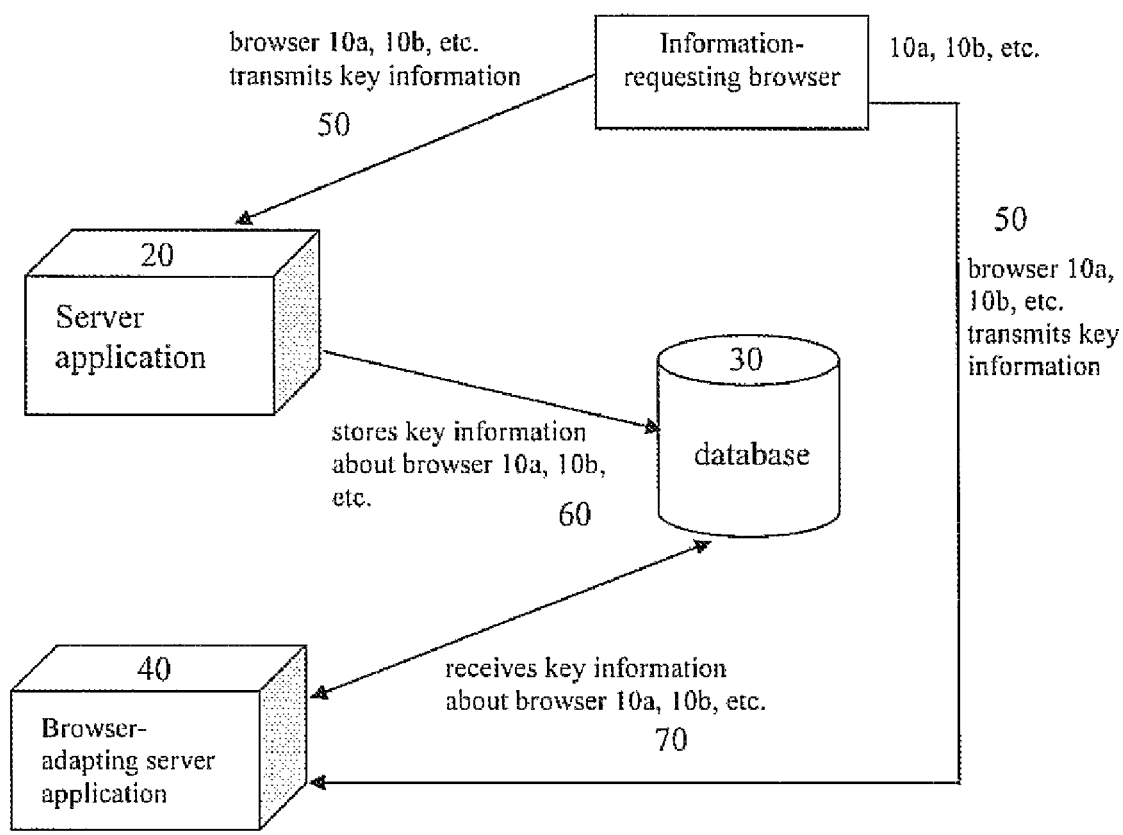
FIG. 2 illustrates a system for testing a browser-adapting server application according to the present invention.

The method for simplified testing of browser-adapting server applications 40 is based on the use of key information recorded by other server applications 20 (step 100) about as large as possible a number of different browser types and versions 10a, 10b, etc, and on using this key information for testing information adaptation methods. In the process, the key information of each individual browser type and of each individual browser version 10a, 10b, etc is transmitted to a browser-adapting server application 40. The information returned by the server application 20 can subsequently be compared, for example, to the information that was supplied, for example, before the adaptation method was modified (step 300).

The present invention takes advantage of the fact that adaptation methods for browser-adapting server applications 40 are based on the evaluation of information 50, 70 that can be directly or indirectly obtained about an information-requesting browser 10a, 10b, etc. (step 100). However, the key to this information is always exactly the information 50 that the information-requesting browser 10a, 10b, etc. transfers directly to the server application 20. This information, here referred to as "key information", can be used to obtain further information about a browser 10. For this purpose, a database 20 can be used which keeps this indirect information available for a server application 20, 40 (step 200).

It is irrelevant to the adaptation method whether this key information is transmitted directly by the browser to which this key information belongs 50, or whether this key information is transmitted by a different information source 70. When the key information from different information sources is identical, the adaptation method cannot distinguish the information sources.

Therefore, given the availability of the key information, information adaptation methods can be tested without directly using the browser.

What is claimed is:

1. A method for testing a browser-adapting server application of a server, the method comprising:
    collecting and recording, using another server application of the server, respective key information of a plurality of browser types and/or versions; and
    testing an information adaptation method of the browser-adapting server application of the server using the key information so as to ensure that the browser-adapting server application functions properly with each of the plurality of browsers.

2. The method as recited in claim 1 further comprising adapting the browser-adapting server application so as to ensure that the browser-adapting server application functions properly with each of the plurality of browsers.

3. The method as recited in claim 1 further comprising evaluating first respective key information of a first information-requesting browser type so as to adapt the browser-adapting server application.

4. The method as recited in claim 3 further comprising directly or indirectly obtaining the respective key information of the information-requesting browser type.

5. The method as recited in claim 1 further comprising transmitting the key information to the browser-adapting server application.

6. The method as recited in claim 2 further comprising comparing first information returned by the another server application to second information returned by the another server application before the adapting of the browser-adapting server application.

7. The method as recited in claim 3 further comprising comparing first information returned by the another server application to second information returned by the another server application before the adapting of the browser-adapting server application.

8. The method as recited in claim 1 further comprising providing a database configured to provide the respective key information for the another server application.

9. The method as recited in claim 8 further comprising providing a database configured to provide the respective key information for the another server application.

10. The method as recited in claim 6 further comprising providing a database configured to provide the respective key information for the another server application.

11. The method as recited in claim 7 further comprising providing a database configured to provide the first respective key information for the another server application.

12. A method for testing a browser-adapting server application of a server, the method comprising the steps of:
    a first browser transmitting a first key information to a first server application of the server;
    the first server application storing the transmitted first key information in a storage medium;
    the browser-adapting server application of the server obtaining a second key information regarding a second browser;
    the browser-adapting server application of the server comparing the second key information with the stored first key information; and
    determining if modifications to the browser-adapting server application of the server are necessary based on the comparison result so as to ensure that the browser-adapting server application functions properly with each of the first and second browsers.

13. The method as recited in claim 12, further comprising the step of:
    modifying the browser-adapting server application for the second browser in response to the second key information; and
    determining if the modifications to the browser-adapting server application will affect the first browser.

14. The method as recited in claim 12, wherein the step of the browser-adapting server application obtaining a second key information regarding a second browser comprises:
    a second browser transmitting the second key information to the first server application; and
    the first server application storing the transmitted second key information in the storage medium; and
    the browser-adapting server application receiving the stored second key information from the storage medium.

15. The method as recited in claim 12, wherein the step of the browser-adapting server application obtaining a second key information regarding a second browser comprises:
    a second browser transmitting the second key information to the browser-adapting server application.

16. The method as recited in claim 1, wherein the key information comprises at least one of a type of the respective browser, a version of the respective browser, languages supported by the respective browser, file formats supported by the browser, and graphic formats supported by the browser.

17. The method as recited in claim 12, wherein the key information comprises at least a type of the respective browser, a version of the respective browser, languages supported by the respective browser, file formats supported by the browser, and graphic formats supported by the browser.

18. A method for testing a browser-adapting server application, the method comprising:
    collecting and recording, using another server application, respective key information of a plurality of browser types and/or versions; and
    testing an information adaptation method of the browser-adapting server application using the key information so as to ensure that the browser-adapting server application functions properly with each of the plurality of browsers,
    wherein the key information comprises at least a type of the respective browser, a version of the respective browser, languages supported by the respective browser, file formats supported by the browser, and graphic formats supported by the browser.

19. The method as recited in claim 18 further comprising adapting the browser-adapting server application so as to ensure that the browser-adapting server application functions properly with each of the plurality of browsers.

20. The method as recited in claim 18 further comprising evaluating first respective key information of a first information-requesting browser type so as to adapt the browser-adapting server application.

* * * * *